United States Patent
Amon et al.

(10) Patent No.: US 8,290,058 B2
(45) Date of Patent: Oct. 16, 2012

(54) METHOD AND DEVICE FOR CODING AND DECODING

(75) Inventors: Peter Amon, München (DE); Andreas Hutter, München (DE); Benoit Timmermann, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 1618 days.

(21) Appl. No.: 11/661,265

(22) PCT Filed: Jul. 29, 2005

(86) PCT No.: PCT/EP2005/053709
§ 371 (c)(1), (2), (4) Date: Feb. 27, 2007

(87) PCT Pub. No.: WO2006/024584
PCT Pub. Date: Mar. 9, 2006

(65) Prior Publication Data
US 2008/0095241 A1  Apr. 24, 2008

(30) Foreign Application Priority Data
Aug. 27, 2004 (DE) .................. 10 2004 041 664

(51) Int. Cl.
*H04B 1/66* (2006.01)
(52) U.S. Cl. ......... 375/240.24; 375/240.16; 375/240.17; 380/217
(58) Field of Classification Search ............. 375/240.16, 375/240.17, 240.24; 380/217
See application file for complete search history.

(56) References Cited

U.S. PATENT DOCUMENTS
2002/0154697 A1  10/2002  Jeon
(Continued)

FOREIGN PATENT DOCUMENTS
DE  100 22 520 A1  11/2001
(Continued)

OTHER PUBLICATIONS
German Office Action in corresponding German Patent Application 10 2004 041 664.8.
(Continued)

*Primary Examiner* — Eleni Shiferaw
*Assistant Examiner* — Paul Callahan
(74) *Attorney, Agent, or Firm* — Staas & Halsey LLP

(57) ABSTRACT

In video coding image sequences, images are coded in a scaled manner to obtain video data which represents the image in multiple steps from a defined image resolution or image quality (e.g., according to the data rate), and the resolution is defined by the number of image pixels of each represented image. Coding is block-based, i.e., for a description of an approximate movement of parts of one of the images in the image sequence, at least one block structure is produced describing the movement. The block structure produced includes a block divided into partial blocks which are in turn divided into sub-blocks. A first block structure is produced temporally for at least one first resolution level and a second block structure is produced for a second resolution level. The first resolution level has a lower image pixel number and/or image quality than the second resolution level. The second block structure is compared to the first block structure such that differences in the block structure are determined, such that on the base of the properties of the structure differences, a modified second block structure is produced. The structure thereof represents one part of the second block structure. Subsequently, the modified block structure and the second block structure are compared based on at least one value which is proportional to the quality of the image and the block structure and the value thereof is directly proportional to an improved quality based on the coding of the bit sequence.

31 Claims, 5 Drawing Sheets

U.S. PATENT DOCUMENTS

2008/0095241 A1     4/2008    Amon et al.
2008/0292002 A1    11/2008    Amon et al.

FOREIGN PATENT DOCUMENTS

| | | |
|---|---|---|
| DE | 102 19 640 A1 | 4/2003 |
| DE | 10 2004 038 110 B3 | 12/2005 |
| DE | 102004038110 B3 | 12/2005 |
| GB | 2 363 274 A | 12/2001 |
| WO | 97/17797 A2 | 5/1997 |
| WO | WO 97/17797 | 5/1997 |
| WO | 2006/024584 A1 | 3/2006 |

OTHER PUBLICATIONS

A. Tambankar et al., "An Overwiew of H.264/MPEG-4 Part 10", 4th EURASIP Conference focused on Video/Image Processing and Multimedia Communications, Jul. 2003, pp. 1-51.

J.R. Ohm, Digitale Bildcodierung, Springer Verlag, 1995, English Abstract of pp. 334, 335 & 406-408, 1 page.

Zhang et al., "Adaptive Quadtree Coding of Motion-Compensated Image Sequences for Use on the Broadband ISDN", IEEE Transactions on Circuits and Systems for Video Technology, vol. 3, No. 3, Jun. 1993, pp. 222-229.

Jizheng Xu et al., "3D Sub-band Video Coding using Barbell lifting", ISO/IEC JTC1/SC29/ WG11, MPEG2004/M10569/S05 Meeting in Munich, Mar. 2004, 14 pp.

M. van der Schaar et al., "A Hybrid Temporal-SNR Fine-Granular Scalability for Internet Video", IEEE Transactions on Circuits and Systems for Video Techznology, vol. 11, No. 3, Mar. 2001, pp. 318-331.

Jizheng Xu et al.; "3D Sub-band Video Coding Using Barbell Lifting"; ISO/IECJTC1/SC29/WG11, MPEG2004/M10569/S05, Mar. 2002; 1-14 pp.

A. Tamhankar et al.; "An Overview of H.264/MPEG-4 Part 10", 4th EURASIP Conference focused on Video/Image Processing and Multimedia Communications, vol. 1, IEEE, 2003, pp. 1-51.

M. van der Schaar et al.; "A Hybrid Temporal-SNR Fine-Granular Scalability for Internet Video"; IEEE Transaction on Circuits and Systems for Video Technology, vol. 11, No. 3, Mar. 2001; pp. 318-331.

J.R. Ohm, "Digiatale Bildcodierung", Springer Verlag, Berlin, 1995, pp. 334, 335 and 406-408.

Zhang et al.; Adaptive Quadtree Coding for Motion-Compensated Image Sequences for Use on the Broadband ISDN; IEEE Transactions on Circuits and Systems for Video Technology. vol. 3, No. 3; Jun. 1993 pp. 222-229.

International Search Report for Application No. PCT/EP2005/053709; mailed Nov. 15, 2005.

FIG 1
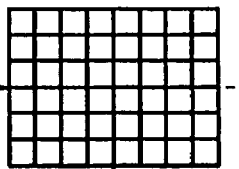
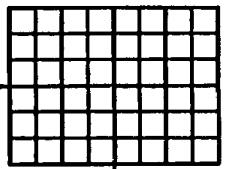
ME for CIF in CIF:
e.g. Block Sizes:
16x16-4x4
DELTA-MVs
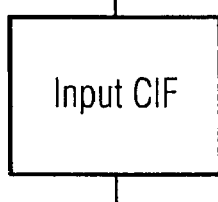
Input CIF
Prediction of motion vectors
Prediction of motion vectors
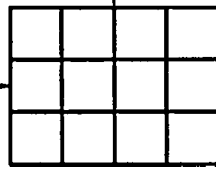
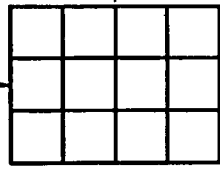
ME for QCIF in CIF:
e.g. Block Sizes:
32x32-8x8
MVs
Encoder    Transmission    Decoder
ME: Motion Estimation
CIF: 352x288 pixels
QCIF: 176x144 pixels
FIG 2
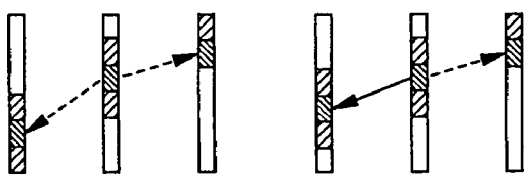
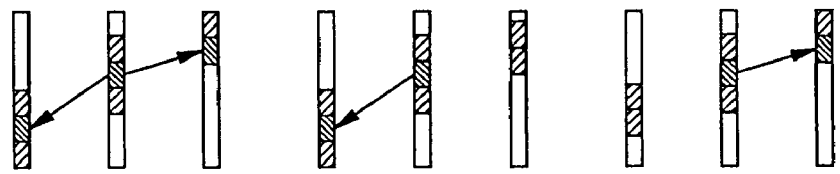

METHOD AND DEVICE FOR CODING AND DECODING

CROSS REFERENCE TO RELATED APPLICATIONS

This application is based on and hereby claims priority to German Application No. 10 2004 041 664.8 filed on Aug. 27, 2004, the contents of which are hereby incorporated by reference.

BACKGROUND

The invention relates to a method and coder for video coding and a decoding device.

Digital video data is generally compressed for storage or transmission in order significantly to reduce the enormous volume of data. Compression is effected both by eliminating the signal redundancy contained in the video data and by removing the irrelevant parts of the signal which cannot be perceived by the human eye. This is normally achieved by a hybrid coding method in which the image to be coded is firstly temporally predicted and the residual prediction error is then transformed into the frequency range, for example by a discrete cosine transformation, and quantized there and coded by a variable length code. Finally, the motion information and the quantized spectral coefficients are transmitted.

The better this prediction of the next image information to be transmitted, the smaller the prediction error remaining after the prediction and the lower the data rate which then has to be used for coding this error. A key object in the compression of video data thus involves obtaining as exact as possible a prediction of the image to be coded from the image information that has previously been transmitted.

The prediction of an image has until now been effected by firstly dividing the image for example into regular parts, typically square blocks of 8×8 or 16×16 pixels in size, and then, through motion compensation, determining for each of these image blocks a prediction from the image information already known in the receiver(blocks differing in size can, however, also be produced). Such a procedure can be seen in FIG. 1. Two basic prediction scenarios can be distinguished:

- uni-directional prediction: here, the motion compensation is based here exclusively on the previously transmitted image and leads to so-called "P-frames".
- bi-directional prediction: the prediction of the image is effected by superimposing two images, one of which lies temporally ahead and another temporally behind and leads to so-called "B-frames". It should be noted here that both reference images will already have been transmitted.

In accordance with these two possible prediction scenarios, five directional modes are produced with motion compensated temporal filtering (MCTF) in MSRA's method, described in Jizheng Xu et al.; "3D subband video coding using Barbell lifting", ISO/IEC JTC1/SC29/WG11 MPEG 68$^{th}$ Meeting, M10569/s05, Munich, March 2004, as can be seen in FIG. 2.

MCTF-based scalable video coding is used in order to provide a good video quality for a very large range of possible bit rates as well as of temporal and spatial resolution levels. The MCTF algorithms known today, however, show unacceptable results for reduced bit rates, which is attributable to the fact that too little texture (block information) is present in relation to the information which refers to the motion information (block structures and motion vectors) of a video defined by an image sequence.

What is needed therefore is a scalable form of motion information in order to achieve an optimal relationship between texture and motion data at each and every bit rate and resolution. To this end, a solution from MSRA (Microsoft Research Asia) is known from the Jizheng Xu et al. article identified above which represents the related art in MCTF algorithms.

The MSRA solution proposes representing motions layer-by-layer, or resolving them into successively more refined structures. The MSRA method thereby achieves the outcome that the quality of images at low bit rates is generally improved.

However, this solution has the disadvantage that it leads to some shifts in the reconstructed image, which can be attributed to a skew between the motion information and the texture.

An improvement in this regard is known from the German patent application with the application number 10 2004 038 110.0.

In the method described in the application, which simply does not transmit completely in particular a complete motion vector field (temporary block structures MV_QCIF, MV_CIF and MV_4CIF), created as per MSRA, that is defined at the encoder end, rather only the most significant part of the motion vector field is transmitted. The creation of the most significant part is effected by a type of refinement of the block structures which is achieved by virtue of the fact that, based on structural characteristics, only parts of the structural differences between consecutive block structures are determined and used for creating refined block structures.

A problem here is that not every visual quality achieved by a refined block structure and associated texture signifies an improvement compared with a visual quality achievable by a corresponding basic structure and associated texture.

SUMMARY

Described below are a method for coding and decoding, a coder and decoder, which enable improved embedding of refined structures.

In the method for the video coding of image sequences, in which images of the image sequence are coded in a scaled manner such that the video data produced contains information which permits the images to be represented in a plurality of differing levels of image resolution defined by the number of pixels per image representation, and/or image qualities (e.g. depending on the data rate), the coding being block-based such that, to describe a displacement of parts of one of the images, the displacement being contained in the image sequence, at least one block structure that describes the displacement is created, the block structure being configured such that it is subdivided from a block into partial blocks, whereby some of the partial blocks are subdivided into successively smaller sub-blocks, a first block structure is temporarily created for at least one first resolution level and a second block structure is created for a second resolution level, the first resolution level having a lower number of pixels and/or image quality than the second resolution level. In addition, the second block structure is compared with the first block structure such that differences in the block structure are determined, so that, on the basis of characteristics of the structural differences, a modified second block structure is created such that the structure thereof represents a subset of the second block structure. The modified second block structure and second block structure are then compared with reference to at least one value proportional to a quality of the image, and the block structure whose value is directly proportional to an improved image quality is taken as the basis for the coding of the image sequence.

By this procedure, the difference between texture information is minimized and furthermore this information can be coded with minimal effort. Moreover, the skew disappears in respect of cases where, for example, the finest motion vector field has been selected, so that an improvement in image quality is provided even at lower bit rates and lower resolutions.

The comparison according to the invention furthermore ensures, particularly through the comparison, that a gradually constantly better fitting and above all optimal adaptation between a motion estimation and the embeddedness of residual error images is achieved. It is also distinguished in being particular efficient.

To this end, sub-blocks added in order to determine differences are preferably recorded, the characteristics of the sub-blocks being recorded as an alternative or in addition to the determination of differences.

If the block size of the sub-blocks is recorded as a sub-block characteristic, a very good indication in practice is obtained of the degree of fineness of the block structures created.

If, for the determination of differences, only the partial block of the first block structure is used that corresponds to the partial block of the second block structure, the differences in the texture information can be reduced still further.

Here, only those sub-blocks of the second block structure whose block size reaches a definable threshold value are preferably imported into the modified second block structure. The result of this is that a complete block structure, i.e. a complete motion vector field, does not have to be transmitted, but only the most significant part of the structure. This leads on the one hand to a reduction in the information to be transmitted and also, despite this reduction, to an elimination or reduction of the skew, so that artifacts in the encoded image are reduced or eliminated. In practice, the use of a definable threshold value here is of particularly great benefit since optimal values determined for example through simulation or experimental trials can be adjusted here, from which, based on the results of the simulation or experiments, very good results can be anticipated.

The threshold value is preferably defined such that it specifies a ratio of the block size of a sub-block of the second block structure to a block size contained in an area, used for the comparison, of the first block structure, the block size being assigned to the smallest sub-block of the area.

Furthermore, a development provides for labeling that the imported sub-blocks can be non-dyadic.

A further improvement of the results with regard to representation of the decoded image can be achieved if the modified second block structure of the second resolution level is used as the first block structure of a third resolution level, the second resolution level having a lower number of pixels and/or image quality than the third resolution level. With this, possible additional block structures of higher resolution levels are used for creating the modified second block structure, the modified second block structure of the respectively preceding resolution level being used for the inventive comparison.

For decoding, it is also advantageous for coding to be effected in such a way that sub-blocks not imported into the second modified block structure are labeled respectively.

To this end, it is preferably provided that the labeling is effected through the use of a directional mode, designated in particular as "not_refined".

In a development of the invention, a bit stream is generated as part of the coding of the bit sequence, such that the bit stream represents a scalable texture, this preferably being effected whereby the bit stream is implemented in a number of bit planes and is varied depending in particular at least on the comparison result and on a bit rate to be implemented for a transmission. In this way, adapted SNR scalability is achieved.

If, moreover, the number of bit planes is varied depending on the resolution level, a fine granularity of SNR scalability is ensured.

It is also advantageous here if, in the event of direct proportionality of the value of the modified second block structure, at least one first part of the bit planes representing the second block structure is updated. The result of this is that the corresponding second modified block structure is available at the decoder end.

The updating can for example be effected such that a second part is transmitted or alternatively that the first part is modified by a second part of bit planes.

The updating is preferably effected such that those regions of a texture assigned to the second block structure are refined which are defined by the modified second block structure, so that in this way ultimately a good image quality is available even for different temporal-spatial resolutions or bit rates without being subject to a drift, which is produced by a skew between motion vector fields and residual error blocks which do not use the refinement of the block structures.

An additional support for finer granularity is achieved if, over and above the number, a second number of bit planes is transmitted at a high bit rate.

The object of the invention is also achieved by the method for decoding a coded image sequence in that, taking into account the information contained in the image sequence and created according to a method, in particular the above-described method, for updating motion information, as well as a bit stream representing a scalable texture, a scaled representation of the image sequence is created.

A contribution toward achievement of the object is also made by the inventive coder which has means for implementing the method and by a corresponding decoder which has means for decoding a coded image sequence created according to the method.

The decoder preferably has means for detecting first signals showing parts of the bit stream representing scalable textures and, additionally, means for detecting second signals showing regions to be updated, the signals being configured in each case in particular as syntax elements. In this way, the improvements achieved by the inventive method in the quality of the representation can be implemented at the decoder end.

If the decoder has means for determining the particular bit plane in which updating leads to improvements in a representation of the coded image sequence and alternatively or additionally means for determining the particular bit plane in which the updating of a texture is to be effected, the refined and scalable representation of the image sequence can be reconstructed exactly.

If the decoder has means for updating a texture which are configured such that updated motion information is taken into account, the elimination of skew achieved by the inventive method for coding can be ensured in the scalable representation of the image sequence created at the decoder end.

Here, the decoder is configured such that an updated texture is formed from an existing texture such that the updated texture information is formed from the texture information assigned to the texture and from a texture updating information, thereby replacing the texture information at least in part by the texture updating information.

BRIEF DESCRIPTION OF THE DRAWINGS

These and other objects and advantages will become more apparent and more readily appreciated from the following description of an exemplary embodiment, taken in conjunction with the accompanying drawings of which:

FIG. 1 is an explanatory diagram of a model of motion estimation for generating scalable motion information, FIG. 2 is an explanatory diagram of the directional modes necessary.

DETAILED DESCRIPTION OF THE PREFERRED EMBODIMENT

Figure 3:
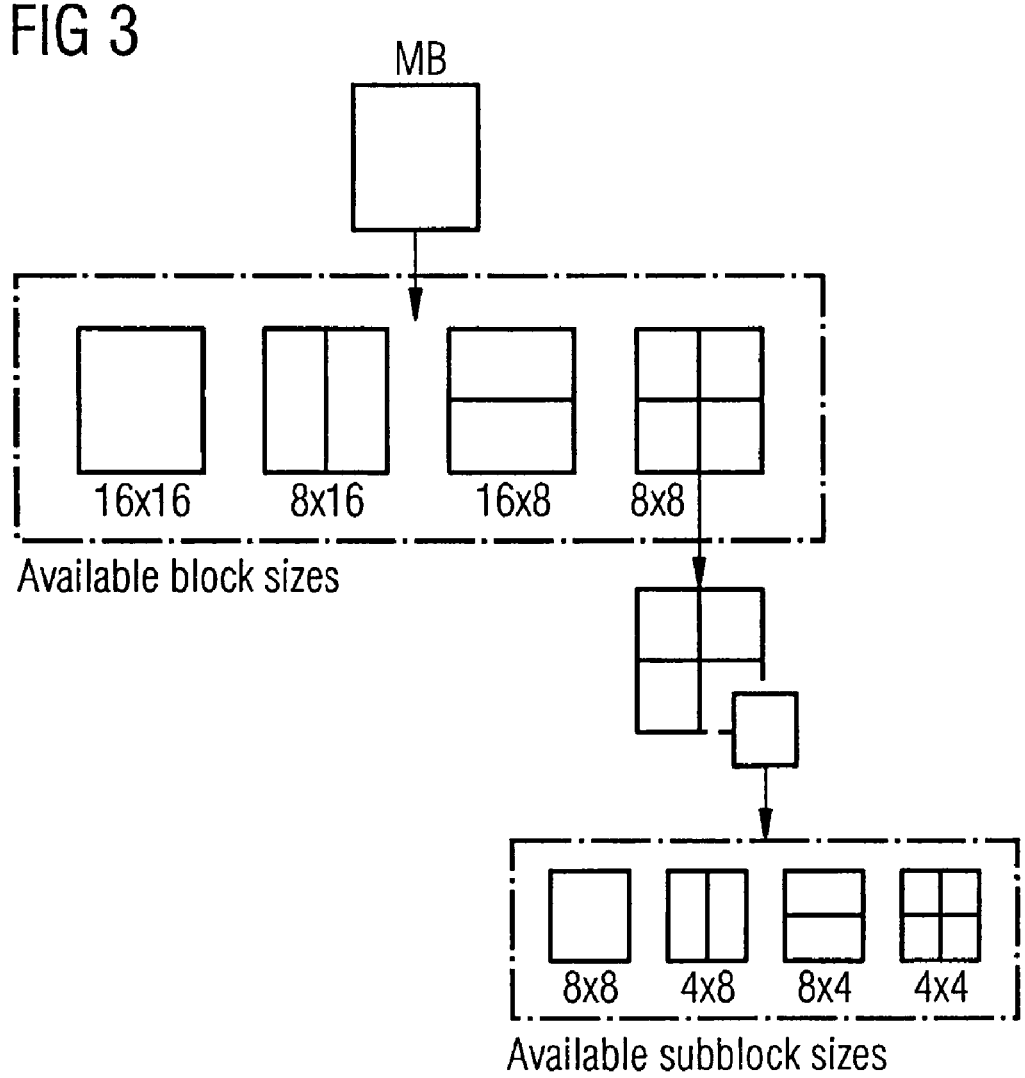
FIG. 3 is an explanatory diagram of the sub-block sizes used.

Reference will now be made in detail to the preferred embodiments, examples of which are illustrated in the accompanying drawings, wherein like reference numerals refer to like elements throughout.

FIG. 1 represents schematically the MSRA solution known from the related art, which is explained to improve understanding of the invention, since it is used at least in parts in the exemplary embodiment described.

According to MSRA, the multilayer motion estimation is implemented in every temporary layer. The motion estimation is implemented at a fixed spatial resolution with various macroblock sizes, so that the motion vector field produced is adapted to the decoded resolution. For example, if the original resolution level is a CIF-coded format and the decoded resolution level occurs as a QCIF format, the motion estimation is carried out on the resolution plane of the CIF format or the CIF resolution, this being done taking a block size of 32×32 as a basis and with a macroblock size of 8×8 as the smallest block size. If, on the other hand, the decoded format is the CIF format, the size of the macroblocks is scaled downward by a factor of 2, as can be seen in FIG. 1.

As can also be seen in FIG. 1, in the lower branch of the processing represented there for the decoding of the block present in QCIF format, the original motion vectors are transmitted, while for each higher layer, for example that which serves for the decoding of the CIF block, only the information regarding the difference between the motion vectors is used. An individual motion vector of a lower layer can serve in predicting a plurality of higher-layer vectors if the block is split up into smaller sub-blocks.

Different modes point to the direction of motion compensation, as has already been alluded to and shown in FIG. 2, while it can be seen from FIG. 3 that in accordance with the MSRA method the block structures are coded according to the same method as is used in the MPEG-4 AVC (Advanced Video Coding) standard (see German Patent Application Number 10 2004 038 110.0).

In order to select the block structure and the direction of motion compensation which are to be encoded, the MSRA approach provides for the use of a so-called cost function which has been defined for this function and which is known under the term "Rate Distortion Optimization".

In the multilayer representation of motion according to MSRA different motion descriptions which are adapted to different spatial resolutions are generated for the same temporal layer (frame rate). The motion estimation which is associated with the higher resolutions is viewed as enriching information (enhancement layer/information) on the basis of a detection of coarse motion information. Since the residual error block created by the coarse motion vector field contains a very large amount of energy, only the particular residual error block which is created after the finest motion compensation is transmitted. This leads, particularly if the coarse motion information is chosen, to very pronounced artifacts, in the reconstructed residual error image, this occurring even at a high bit rate.

Figure 4:
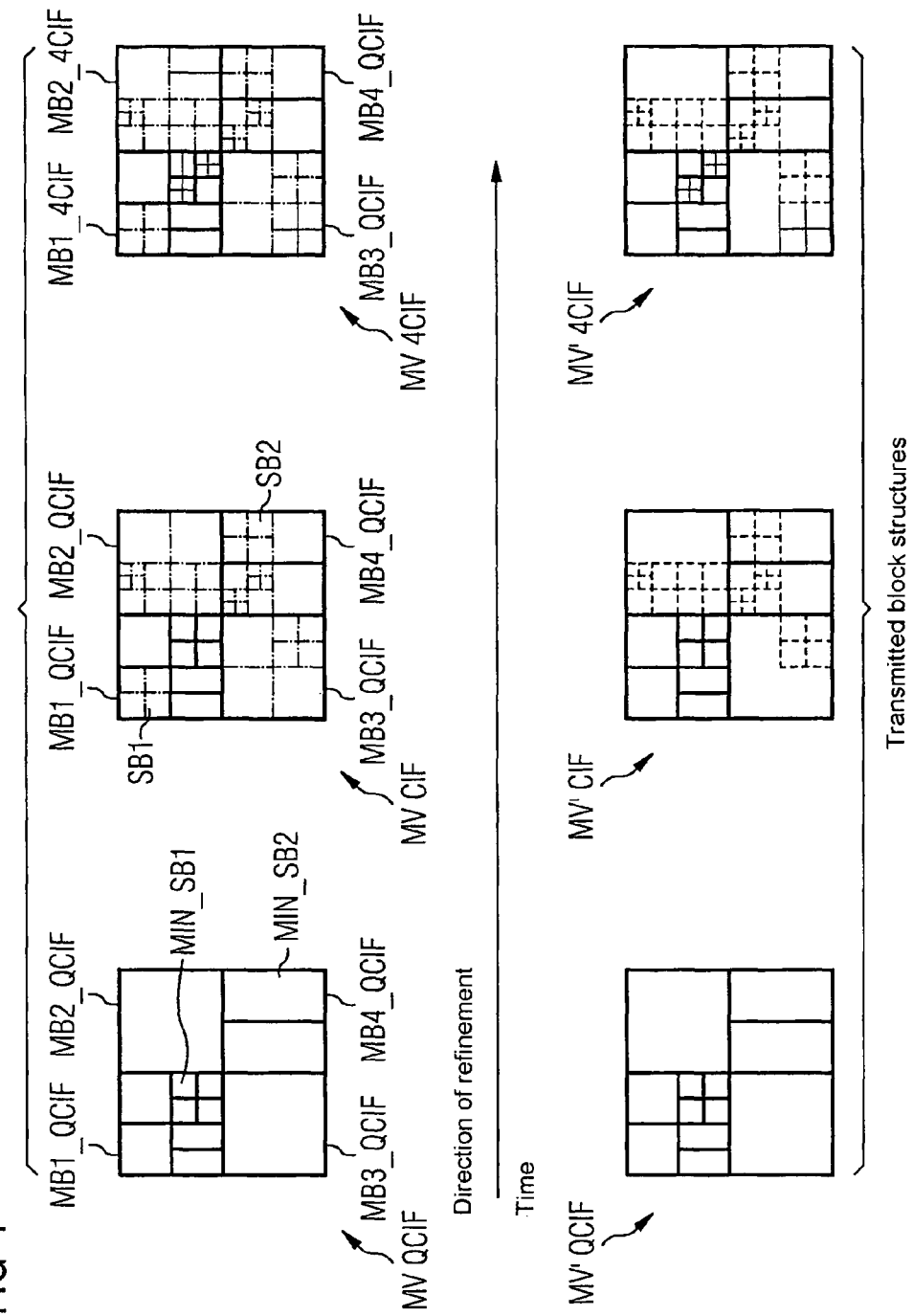
FIG. 4 is a schematic representation of block structures created.

FIG. 4 shows how temporary block structures created according to the invention lead, using the method according to the invention, to block structures which are ultimately to be transmitted.

Three temporary block structures MV_QCIF, MV_CIF and MV_4CIF can be seen. Each of these block structures is assigned respectively to a "resolution level" designating the format of the resolution with which a video signal, which consists of image sequences, which is coded according to the method can be represented.

For the present exemplary embodiment, the formats concerned are the Common Intermediate Format (CIF), the QCIF and the 4CIF format.

QCIF represents a first resolution level, i.e. the lowest resolution level chosen for the inventive method, so that according to the invention a first block structure MV_QCIF is also assigned to it, while CIF represents a second resolution level, for which according to the invention a second block structure MV_CIF is created.

The creation of the block structures is carried out within the framework of a motion estimation algorithm, for example using the previously mentioned MCTF and/or MSRA method.

It can also be seen that the temporary block structures MV_QCIF, MV_CIF and MV_4CIF have successively refining sub-block structures which are characterized in that, based on partial blocks MB1_QCIF . . . MB4_QCIF defined for each temporary block structure MV_QCIF, MV_CIF and MV_4CIF, ever more refined further sub-blocks are added.

It can also be seen from the representation that the temporary block structures MV_QCIF, MV_CIF and MV_4CIF have the same spatial resolution, this remaining constant despite the increasing number of pixels from resolution level to resolution level.

Also to be seen in FIG. 4 are the block structures MV_QCIF, MV_CIF and MV_4CIF to be transmitted or ultimately, for example for a streaming application, transmitted, which are created using the inventive method from the temporary block structures MV_QCIF, MV_CIF and MV_4CIF, whereby a block structure associated with a high resolution level is respectively compared with a block structure associated with a next-lower resolution level and as a result a modified block structure associated with the resolution level under consideration is generated that has sub-block structures which contain only a subset of the temporary block structure associated with the same resolution level, the subset concerned being not a genuine subset, which would rule out the case where the sub-block structure of the modified block structure is identical to the sub-block structure of the corresponding temporary block structure, but is only a (simple) subset known for example from mathematics, since it is rather even such that this special case can also occur according to the invention.

This inventive algorithm will be explained below in somewhat greater detail.

According to the invention, the creation of a block structure associated with the lowest resolution level is started. From this first block structure MV_QCIF, the modified block structure MV'_QCIF is produced directly according to the invention, since, in this case, of course, no comparison can be made with a previous block structure. The modified block structure MV'_QCIF which is produced directly therefore has the same sub-block structure as the first block structure MV_QCIF.

To reach the next higher resolution level, in this case CIF, a second block structure MV_CIF is created. It can be seen here that additional sub-blocks have been added to the second block structure MV_CIF which lead to a finer sub-block structure than the first block structure MV_QCIF by comparison. The sub-blocks or sub-block structures which have been added are represented in the figure by dashed lines.

Next a comparison is carried out in which the added sub-blocks are checked to ascertain whether they have a block size which is over four times smaller than the smallest block size of the corresponding sub-area of the first block structure.

If this is so, then the corresponding sub-block structure is incorporated in a modified second block structure MV'_CIF, while in cases where the sub-block to be examined represents a lower refinement, incorporation of the sub-block structure in the modified second block structure to be transmitted is dispensed with.

In order to be able to explain this in a better manner, two of the sub-blocks contained in the second block structure MV_CIF have been picked out by way of example in FIG. 4, namely a first sub-block SB1 and a second sub-block SB2.

The first sub-block SB1 is located in a first partial block MB1_CIF of the second block structure MV_CIF. Correspondingly, according to the invention, an examination is made in a first partial block MB1_QCIF of the first block structure MV_QCIF corresponding to the first partial block MB1_CIF of the second block structure MV_CIF as to which is the smallest sub-block size occurring here. In the present example, this minimal block size is defined by a minimal first sub-block MIN_SB1. As can be seen, the size of the first sub-block corresponds to the size of the first minimal sub-block so that in this case no refinement has occurred. According to the invention, the sub-block structure on which the first sub-block is based is correspondingly not incorporated in the second block structure MV'_CIF to be transmitted so that in the representation shown in FIG. 4 of the second modified block structure MV'_CIF the dashed grid is absent from the corresponding position.

In the comparison, among others a second sub-block SB2 is also used for the comparison. Since the second sub-block SB2 is contained in a fourth sub-block MB4_CIF of the second block structure MV_CIF, correspondingly a minimal sub-block size is sought in a fourth sub-block MB4_QCIF of the first block structure MV_QCIF. This is given by a second minimal sub-block MIN_SB2 which in this case divides the fourth partial block MB4_QCIF of the first block structure MV_QCIF exactly. As can be seen, the size of the second sub-block SB2 constitutes in this case an eighth of the size of the minimal second sub-block MIN_SB2, so that there is even an eight-fold refinement by comparison with the first block structure MV_QCIF. According to the invention, the sub-block structure defining the second sub-block is therefore also incorporated in the modified second block structure MV'_CIF. The same occurs for all those blocks of the second block structure MV_CIF as can be seen in the representation shown in FIG. 4 from the dashed structures of the modified second block structure MV'_CIF.

As is evident from a comparison of the second block structure MV_CIF and the modified second block structure MV'_CIF, not all the sub-block structures of the second block structure MV'_CIF have been incorporated. In order that an image sequence coded in this way can now be represented correctly, in the coding of the block structures which are to be transmitted, a labeling of those sub-blocks which have not been incorporated in the modified block structures is included in the coding. The inventive method is also applied in the same manner in further resolution levels. For example, in accordance with the present exemplary embodiment, a block structure MV__4CIF is likewise created for the 4CIF format. According to the invention, this is now used in turn as a second block structure, while the first block structure is given by the preceding second block structure MV_CIF. The second modified block structure MV'__4CIF produced by comparing the two block structures has in turn been refined in the representation of FIG. 4 only by some of the added sub-block structures, which are drawn as dotted lines in the representation.

Alternatively or additionally, instead of a temporary block structure, a previously created and transmitted block structure, i.e. modified second block structure, can be used as a first block structure for the comparison.

According to the invention it is not necessary to create block structures to be transmitted according to the invention for all resolution levels coded in the image sequence, but for example only in the partial resolutions of the resolutions, i.e. for example only for CIF in cases where QCIF, CIF or 4CIF has been used or only for CIF in cases where QCIF and CIF have been used. Rather, in practice, it suffices to apply this to intermediate resolution levels by comparison with all existing resolution levels since the best performance is produced at an intermediate resolution level because multiple up and down sampling of block structures and of motion vectors can be avoided here. The data rate for the motion information is adjusted in each case here by a parameter for the various spatial resolution levels so that at each resolution level an optimal ratio of the data rate for motion information and texture information is produced.

The invention is not limited to the exemplary embodiment explained with the aid of FIG. 4, but covers all eligible implementations within the scope of the knowledge of a person skilled in the art.

Simply not to transmit the complete motion vector field created in particular as per MSRA (temporary block structures MV_QCIF, MV_CIF and MV__4CIF), which is defined or is present at the encoder end), rather only the most significant part of this motion vector field.

A substantial advantage of the inventive algorithm is the improvement of image quality even at low bit rates as well as at low resolutions.

Figure 5:
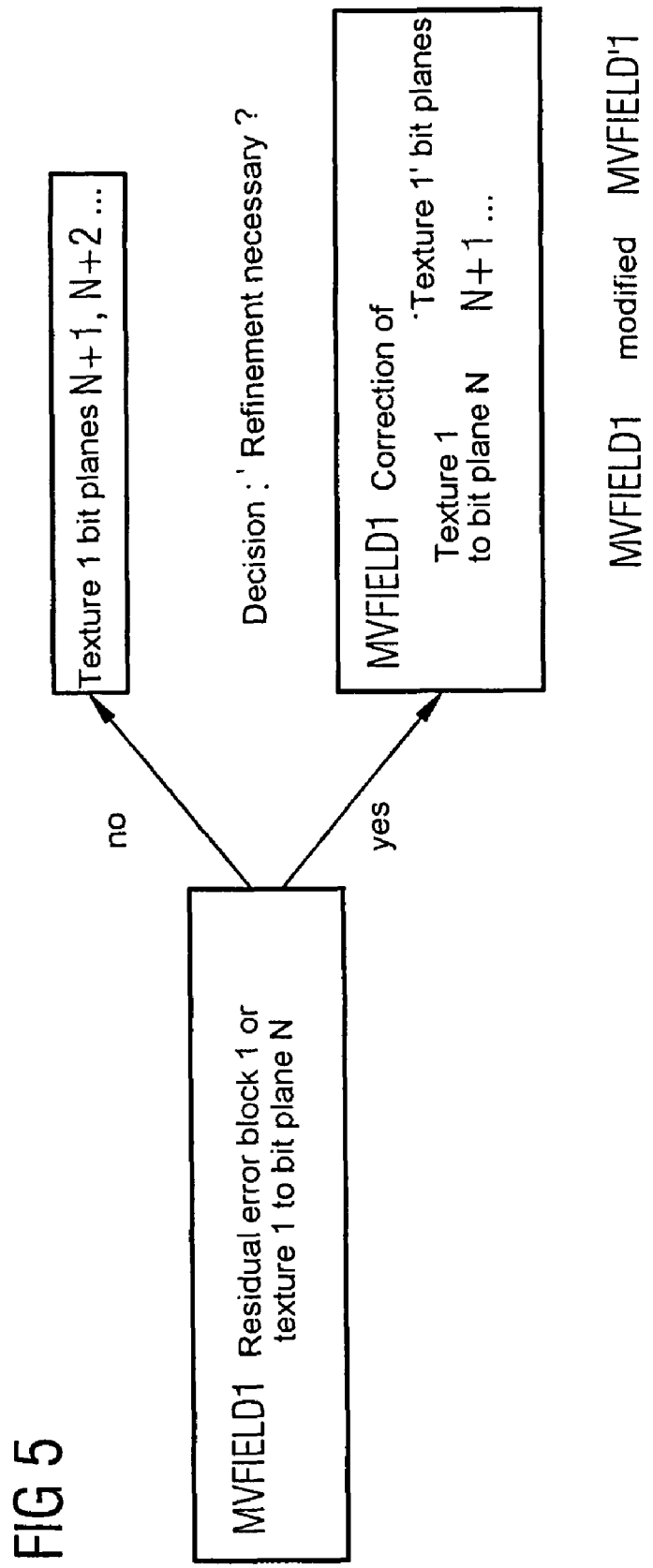
FIG. 5 is a flowchart of the decision concerning updates.

FIG. 5 shows the method taken as a basis for the signaling explained above and also—as revealed below—for generating the bit stream.

According to the above-described selective refinement method according to the invention, the new block mode proposed according to the invention shows whether a block structure for a currently viewed motion vector field has to be split up for the subsequent motion vector field. Based upon these block modes, it is therefore possible to pinpoint the regions which [have] a current residual error block which differs from a preceding residual error block assigned to a lower layer.

The blocks which are assigned to or are associated with these regions are then compared with the blocks located in the same positions inside the preceding residual error block and the difference in relation thereto coded. Once this information has been stored at the encoder end, it is necessary to achieve the best possible, i.e. optimal match between the motion information and the texture for the respective bit rate.

As a rule, a bit stream is generated for this purpose prior to transmission so that all the information available at the encoder end can be optimally used.

In order to achieve this, a comparison for the purposes of an evaluation is carried out for example, as shown in FIG. 5, in which it is ascertained whether a motion vector field (block structure) has to be refined or not.

This is advantageous according to the invention for the reason that it may happen in practice that the visible quality which with the basic motion vector field (block structure) MVFIELD1 and the corresponding Texture1 may be better by a value amounting to x % of the Texture1 than the result which is obtained when this motion vector field has been refined into a modified block structure MVFIELD2 and consequently also better than the corresponding refinement of the Texture'1 (defined by y % of (Texture1)+refinement). Here, y is less than x at the same bit rate.

From the schematically represented corresponding decision-making procedure it can be seen that, in the event of a refinement appearing necessary, the part of the information which relates to the texture information has to be adapted correspondingly. This, however, also produces the problem of which part of the texture information is assigned to the refinement information.

As explained above, this is made possible firstly by suitable signaling which makes it possible at the decoder end to pinpoint those regions in the residual error blocks which can and, above all, should be refined. This therefore enables the decoder to recognize and correspondingly to take into account the previously described inventive method in which the refinement of the motion information was adapted such that the embedding of the residual error block was enabled, i.e. the part of the refinement of a residual error block is represented by some other blocks.

Secondly, suitable encoding is also required for this purpose which, in order to be efficient for the purposes of compression efficiency, is carried out in such a way that the refinement blocks are encoded with a block-based transformation (IT, DCT, etc.), these blocks then representing the difference between the residual error blocks based upon refinement of the motion vector fields and the residual error blocks which have not been created on the basis of refined motion vector fields and have a defined number of bit planes, for example N bit planes.

Figure 6:
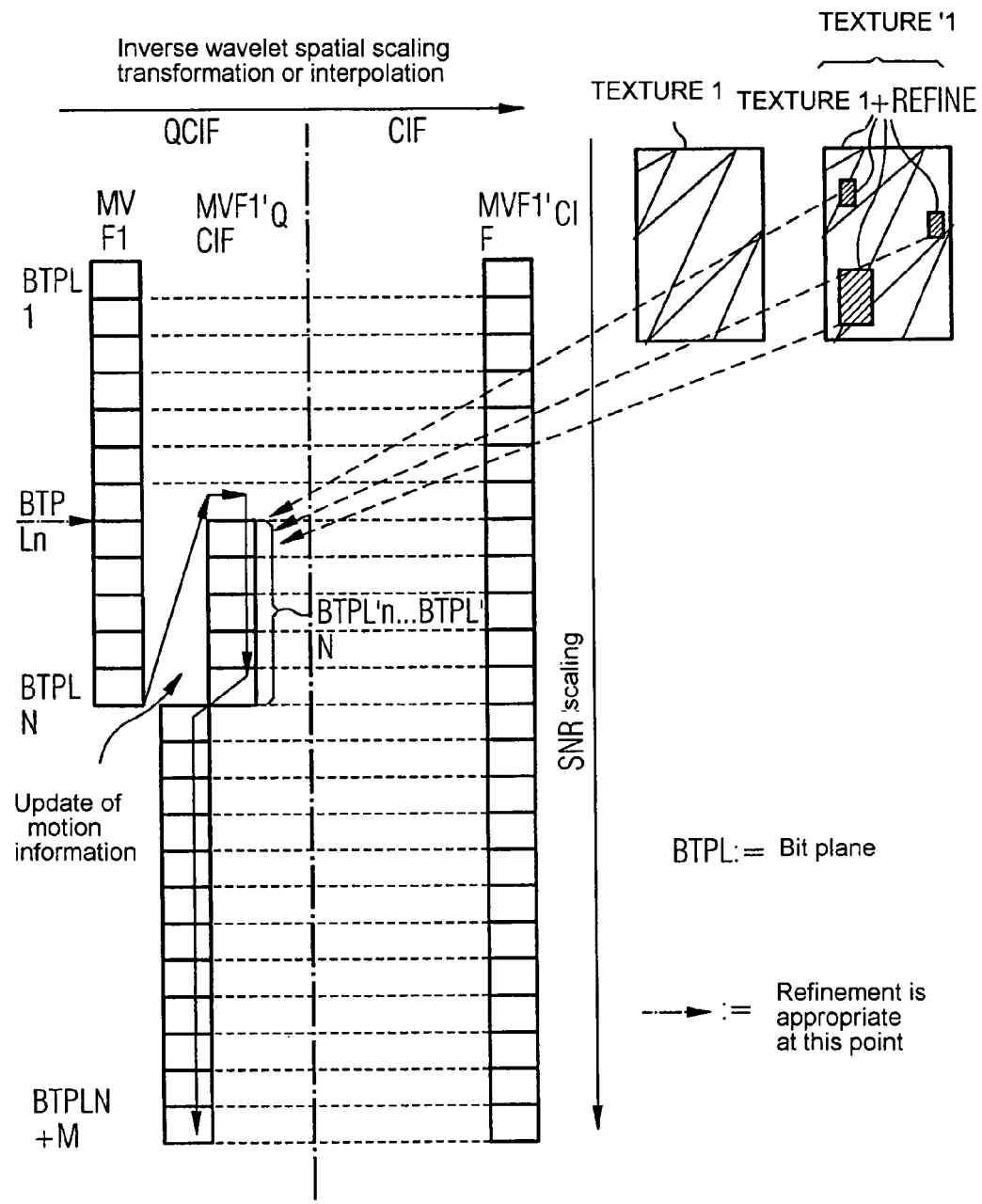
FIG. 6 is an explanatory diagram of the creation of an updated bit stream.

Finally, however, suitable organization of the bit stream to be generated for the transmission is also required for this purpose, as is shown in FIG. 6.

The aim of this inventive generation of the bit stream is to provide a good image quality for different spatial/temporal resolution levels or bit rates, without having a drift, which can occur as a result of a skew between a motion vector field and a residual error block. The steps with which this can be achieved are therefore represented schematically.

The exemplary embodiment shown proceeds from an initialization status in which a defined number of motion vector fields with corresponding residual error blocks have been created at the encoder end. For example, a first motion vector field MVF1 and a first refined motion vector field MVF1' for a QCIF resolution, the first refined motion vector field MVF1' and (not shown) a second motion vector field for a CIF resolution and the second motion vector field and a third motion vector field for a 4CIF resolution. The encoding and decoding for a scenario of this type with a QCIF resolution emerge in the inventive method as follows: based on the assumption that a large range of bit rates has to be decoded for the QCIF resolution, it is necessary first to transmit the first motion vector field MV1 and the first corresponding residual error block. The rule here is that the larger the bit rate, the higher the number of bit planes BTPL1 ... BTPLN+M which represent the residual error block. It is also the case that the number is limited by the decision explained in the introduction concerning the refinement of blocks.

According to the example shown, the number of bit planes is limited to a number N. If in accordance with the inventive evaluation, the decision is now taken that a refinement is necessary, the first motion vector field MVF1 is refined such that the refined motion vector field MVF1' is created. In such a case, it is therefore also necessary for the texture corresponding to the first motion vector field MVF1 to be updated in order to prevent a skew between the motion vector fields and the respective textures.

An algorithm proposed here according to the invention can also be seen in the diagram and runs as follows.

If the above-mentioned evaluation of motion information reveals that an update of the motion information is required, then a certain number of bit planes BTPL1 ... BTPLN has generally already been transmitted. Up to a certain threshold value BTPLn, the bit planes which represent the residual error blocks (BTPL1 ... BTPLn) that have not been refined, must not be modified. When this limit BTPLn is reached, on the other hand, the subsequent bit planes BTPLn ... BTPLN are updated as per the exemplary embodiment.

This is carried out starting with the bit plane which represents the last bit plane of the non-refined residual error blocks BTPLn and extends up to the bit plane which has already been transmitted BTPLN.

The update is carried out such that the regions which are associated with the refined parts REFINEMENT are updated such that they match the subsequent motion vector field, i.e. according to the exemplary embodiment shown, the first refined vector field MVF1'.

According to the invention, where a higher bit rate is involved, the number of bit planes BTPLN+1 to BTPLN+M over and above the number of bit planes BTPLN already transmitted can additionally be transmitted. This concept is repeated for each spatial resolution and/or quality level and thus enables a finer granularity of signal/noise scalability (SNR scalability).

According to the initial scenario, encoding and decoding at a CIF resolution level takes place as follows.

Since, according to the invention, the SNR and spatial scalability is also to be combined here, then if for example it is necessary to decode a (video) bit stream at CIF resolution and this is to be carried out at a lower bit rate, the first modified motion vector field MVF1' is scaled up from QCIF resolution to CIF resolution. In addition, for example, an inverse wavelet transformation is carried out or else an interpolation is carried out in order to achieve a higher spatial resolution of the texture TEXTURE1, TEXTURE'1.

It should be noted that if the bit rate is very low, updating of the texture TEXTURE1 to TEXTURE'1 is not required (for example, if fewer that n bit planes are necessary in order to decode the CIF resolution). Overall, a spatial scalability is achieved by this means.

SNR scalability at CIF resolution is achieved by coding the bit planes of the difference between the original refined CIF residual error block and an interpolated or inverse-wavelet-transformed refined QCIF bit plane. If the decision as to whether a refinement should be carried out is positive at CIF resolution, the same strategy is followed as has been explained in the case of the method described above for QCIF. The same applies to scaling from CIF to 4CIF.

The invention is not, however, restricted to the exemplary embodiment described. Rather, the following also applies:

1. SNR scalability is created through a bit-plane-based representation of texture information in accordance with the example shown hereinabove, but is not restricted thereto, since it can also be achieved through alternative scalable texture representations.
2. The maximum number of bit planes which occur before refinement (BTPLN) may differ for each spatial resolution.
3. In addition, more than one update can take place within a spatial resolution level if more than two layers of motion information are used for this spatial resolution level.

Irrespective of this, a very good match between motion information and the texture is always achieved for a wide range of bit rates and spatially temporal resolutions, this being achieved without degradation of the quality of images since a good distribution of information is achieved and consequently the skew between motion information and textures is also eliminated.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for video coding of image sequences having images coded in a scaled manner that produces video data containing information which permits the images to be represented in different levels of image resolution defined by at least one of a number of pixels per image representation and image qualities, where the video coding is block-based and describes a displacement of parts of one of the images, contained in the image sequence, by creating at least one block structure that describes the displacement, the block structure being configured such that a block is subdivided into partial blocks and some of the partial blocks are subdivided into successively smaller sub-blocks, comprising:

temporarily creating a first block structure for at least one first resolution level and a second block structure for a second resolution level, the first resolution level having at least one of a lower number of pixels and a lower image quality than the second resolution level;

comparing the second block structure with the first block structure to determine structural differences in the block structure of each;

creating a modified second block structure, based on characteristics of the structural differences, having a structure representing a subset of the second block structure;

comparing the modified second block structure and the second block structure based on at least one value proportional to the image quality of each; and video coding of a bit sequence using a programmed processor to form encoded image sequences, representing images with different levels of image resolution, from one of the modified second block structure and the second block structure, having a value directly proportional to an improved quality.

2. The method as claimed in claim 1, further comprising recording added sub-blocks to determine differences.

3. The method as claimed in claim 1, further comprising recording sub-block characteristics to determine differences.

4. The method as claimed in claim 3, wherein the block size of the sub-blocks is recorded as a sub-block characteristic.

5. The method as claimed in claim 4, wherein said comparing of the first and second block structure for determination of differences uses only a partial block of the first block structure corresponding to a partial block of the second block structure.

6. The method as claimed in claim 5, wherein said creating of the second modified block structure is based on a threshold value decision.

7. The method as claimed in claim 6, wherein said creating of the modified second block structure imports into the modified second block structure only specific sub-blocks of the second block structure having at least one first block size that reaches a threshold value.

8. The method as claimed in claim 7, wherein the threshold value describes a ratio of the first block size of one of the sub-blocks of the second block structure to a second block size contained in an area of the first block structure used for said comparing, the second block size being assigned to a smallest sub-block of the area.

9. The method as claimed in claim 8, wherein the specific sub-blocks imported into the modified second block structure can be subdivided non-dyadically 10. The method as claimed in claim 9, wherein the modified second block structure of the second resolution level is used as a first block structure of a third resolution level, the second resolution level having at least one of fewer pixels and lower image quality than the third resolution level.

11. The method as claimed in claim 10, further comprising labeling unimported sub-blocks that are not imported into the second modified block structure accordingly.

12. The method as claimed in claim 11, further comprising labeling non-dyadically divided sub-blocks accordingly.

13. The method as claimed in claim 12, wherein said labeling uses a directional mode and uses a not_refined designation.

14. The method as claimed in claim 13, wherein said video coding of the bit sequence produces a bit stream that represents, in combination with an updating of motion information, a scalable texture, the bit stream implemented through texture resolution levels and varied depending in particular at least on said comparing and on a bit rate to be implemented for transmission.

15. The method as claimed in claim 14, wherein the texture resolution levels are implemented as a first number of bit planes.

16. The method as claimed in claim 15, wherein the first number of bit planes is varied depending on resolution level.

17. The method as claimed in claim 16, further comprising updating at least a first part of the bit planes representing the texture when there is direct proportionality of the value of the modified second block structure.

18. The method as claimed in claim 17, wherein said updating includes transmitting a second part of the bit planes representing the texture.

19. The method as claimed in claim 17, wherein said updating includes modifying the first part by a second part of the bit planes representing the texture.

20. The method as claimed in claim 19, wherein said updating includes refining regions of a texture assigned to the second block structure and defined by the modified second block structure.

21. The method as claimed in claim 19, further comprising transmitting, at a high bit rate, a second number of bit planes, above the first number.

22. A method for decoding a coded bit sequence created in accordance with the method as claimed in claim 1, comprising:
producing a scalable representation of the image sequence, taking into account updating of motion information, contained in the image sequence, and a bit stream representing a scalable texture.

23. A coder for creating a coded image sequence having images coded in a scaled manner that produces video data containing information which permits the images to be represented in different levels of image resolution defined by at least one of a number of pixels per image representation and image qualities, where the video coding is block-based and describes a displacement of parts of one of the images, contained in the image sequence, by creating at least one block structure that describes the displacement, the block structure being configured such that a block is subdivided into partial blocks and some of the partial blocks are subdivided into successively smaller sub-blocks, comprising a processor programmed to perform operations including:
temporarily creating a first block structure for at least one first resolution level and a second block structure for a second resolution level, the first resolution level having at least one of a lower number of pixels and a lower image quality than the second resolution level;
comparing the second block structure with the first block structure to determine structural differences in the block structure of each;
creating a modified second block structure, based on characteristics of the structural differences, having a structure representing a subset of the second block structure;
comparing the modified second block structure and the second block structure based on at least one value proportional to the image quality of each; and
video coding a bit sequence, representing images with different levels of image resolution, using one of the modified second block structure and the second block structure, having a value directly proportional to an improved quality.

24. A decoder for decoding a coded bit sequence created in accordance with the method as claimed in claim 23, wherein said processor further performs an operation of producing a scalable representation of the image sequence, taking into account updating of motion information, contained in the image sequence, and a bit stream representing a scalable texture.

25. The decoder as claimed in claim 24, wherein said processor further performs an operation of detecting first signals showing parts of the bit stream representing scalable textures, the first signals being configured as first syntax elements.

26. The decoder as claimed in claim 25, wherein said processor further performs an operation of detecting second signals showing regions to be updated, the second signals being configured as second syntax elements.

27. The decoder as claimed in claim 26, wherein said processor further performs an operation of determining a particular bit plane in which updating leads to improvements in a representation of the coded bit sequence.

28. The decoder as claimed in claim 27, wherein said processor further performs an operation of determining the particular bit plane in which a texture is to be updated.

29. The decoder as claimed in claim 28, wherein said processor further performs an operation of updating a texture taking into account updated motion information.

30. The decoder as claimed in claim 29, wherein said processor further performs an operation of forming an updated texture from an existing texture such that updated texture information is formed from the texture information assigned to the existing texture and from texture updating information.

31. The decoder as claimed in claim 30, wherein said processor further performs an operation of replacing the texture information at least in part by the texture updating information.

* * * * *